United States Patent
Vassos et al.

[11] Patent Number: 5,553,808
[45] Date of Patent: Sep. 10, 1996

[54] FEEDING OF A MACHINE WITH A TURRET SUPPORTING REMOVABLE MAGAZINES DISTRIBUTING STRIPS BY MEANS OF AN EXTERNAL SOURCE

[75] Inventors: Alain A. Vassos, Crissey; Daniel G. Thibert, Chatenoy-le-Royal, both of France

[73] Assignee: Eastman Kodak Company, Rochester, N.Y.

[21] Appl. No.: 397,142

[22] PCT Filed: Jul. 9, 1993

[86] PCT No.: PCT/FR93/00710
§ 371 Date: Mar. 7, 1995
§ 102(e) Date: Mar. 7, 1995

[87] PCT Pub. No.: WO95/02206
PCT Pub. Date: Jan. 19, 1995

[51] Int. Cl.[6] .................................................. B65H 19/10
[52] U.S. Cl. ............................................................ 242/559.2
[58] Field of Search ............................ 242/554.3, 555.5, 242/559.2, 560, 560.1, 560.2, 562.1, 563, 564, 564.1, 566, 533.4, 533.5, 533.6; 355/28, 310, 311

[56] References Cited

U.S. PATENT DOCUMENTS

| 3,951,023 | 4/1976 | Ashburner | 355/310 |
| 4,948,060 | 8/1990 | Kurz et al. | 242/559.2 |
| 4,957,247 | 9/1990 | Nakamura et al. | 242/533.6 |
| 5,107,296 | 4/1992 | Ozawa et al. | 355/28 |
| 5,308,005 | 5/1994 | Hutteman et al. | 242/562.1 |
| 5,383,591 | 1/1995 | Thibert | 226/108 |

FOREIGN PATENT DOCUMENTS

| A-2540610 | 3/1977 | Germany . | |
| A-3715179 | 11/1988 | Germany . | |
| 60-67350 | 4/1985 | Japan | 242/562.1 |
| WO91/19222 | 12/1991 | WIPO . | |

Primary Examiner—John P. Darling
Attorney, Agent, or Firm—Carl F. Ruoff; Mark G. Bocchetti

[57] ABSTRACT

A machine for feeding products in strip form to a photographic printer. The machine includes a plurality of feed magazines disposed on a rotary turret. When it is desired to use an external strip feed source, for example a large-capacity magazine, use is made of an interfacing device defining a guide path connecting the discharge slot on the external strip feed source to the inlet slot on the machine. At least part of the guide path of the interfacing device is rotatable with the rotary turret.

6 Claims, 6 Drawing Sheets

FEEDING OF A MACHINE WITH A TURRET SUPPORTING REMOVABLE MAGAZINES DISTRIBUTING STRIPS BY MEANS OF AN EXTERNAL SOURCE

The invention relates to the feeding of machines with strips and particularly machines having multiple feed magazines disposed on a turret to enable the strip of paper being used, and which comes from one of the magazines, to be changed automatically. More particularly, the strips used are photosensitive products such as paper and the machine is a photographic printer.

Photographic printers using loaders are well known. However, the loaders are installed manually on the machines and their weight limits the lengths of strip available in such loaders. Large-capacity loaders which cannot be moved manually have therefore been produced. Such loaders are described for example in WO 91/19222 and, between the loaders and the machine, an interface is used similar to the one described in U.S. Pat. No. 5,383,591.

High-output photographic printers also exist on the market, for example the KODAK CLAS 35 printer. In this type of machine, the photosensitive paper strip feed is obtained by means of loaders. The loaders are disposed on a turret so that the magazine used as a strip dispenser can be changed automatically. A splicing station enables the new strip to be connected to the strip already fed in during use. Since the operation of these machines is controlled by a computer, it has been easy to modify the operation provided in order to take maximum advantage of the capabilities of the machine. It is advantageous to dispose on the feed turret chargers fitted with strips of photosensitive paper of different qualities, for example matt or glossy, or having different grades. The computer automatically manages the feeding of the strips so as to match the type or quality of the strip to the order to be filled. To do this, the strip is cut during feeding, the turret is rotated so as to present another strip to the feed station, the strip of paper with the new quality is spliced on and the length of strip desired is delivered. This series of operations is repeated each time it is required to change the quality of the paper in order to produce the prints ordered.

It has been noted that generally great lengths of strips of photosensitive paper of a given quality are used, compared with the lengths of strips of photosensitive paper with the other qualities, and that it would be desirable to be able to use large-capacity loaders for this type of quality.

The aim of the invention is to provide a machine which resolves the above problems without losing the advantages in use provided by the machine. To this end, the machine comprises: a) an inlet slot for receiving a strip and directing it to a station where it is to be used; b) a feed device provided with a rotary turret able to receive several removable feed magazines containing rolls of material in strip form; c) a means for driving, towards the inlet slot, a strip coming from a given feed magazine; and d) a means for interrupting the feed of the strip for the purpose of changing the feed magazine used. It is characterised in that it also comprises an interfacing device arranged so as to connect the inlet slot to an external strip feed source, in that the said interfacing device comprises a guide path for the strip coming from the external source and in that the said guide path has a part able to rotate with the turret.

In the preferred embodiment according to the invention, for which photosensitive strips are used, the interfacing device comprises a first part for connecting the external source to the part of the path able to rotate with the turret when this path part is used, the said first part being able to tilt between a first position so as to provide a lightproof path during use and a second position situated outside the space defined by the removable magazines disposed on the turret when the latter rotates. The interfacing device comprises a means for returning the strip situated in the part able to rotate with the turret to the external source when use is made of the means for interrupting the feed of the strip coming from the external source.

Other characteristics and advantages of the invention will emerge from a reading of the following description given with reference to the accompanying drawing in which.

Figure 1:
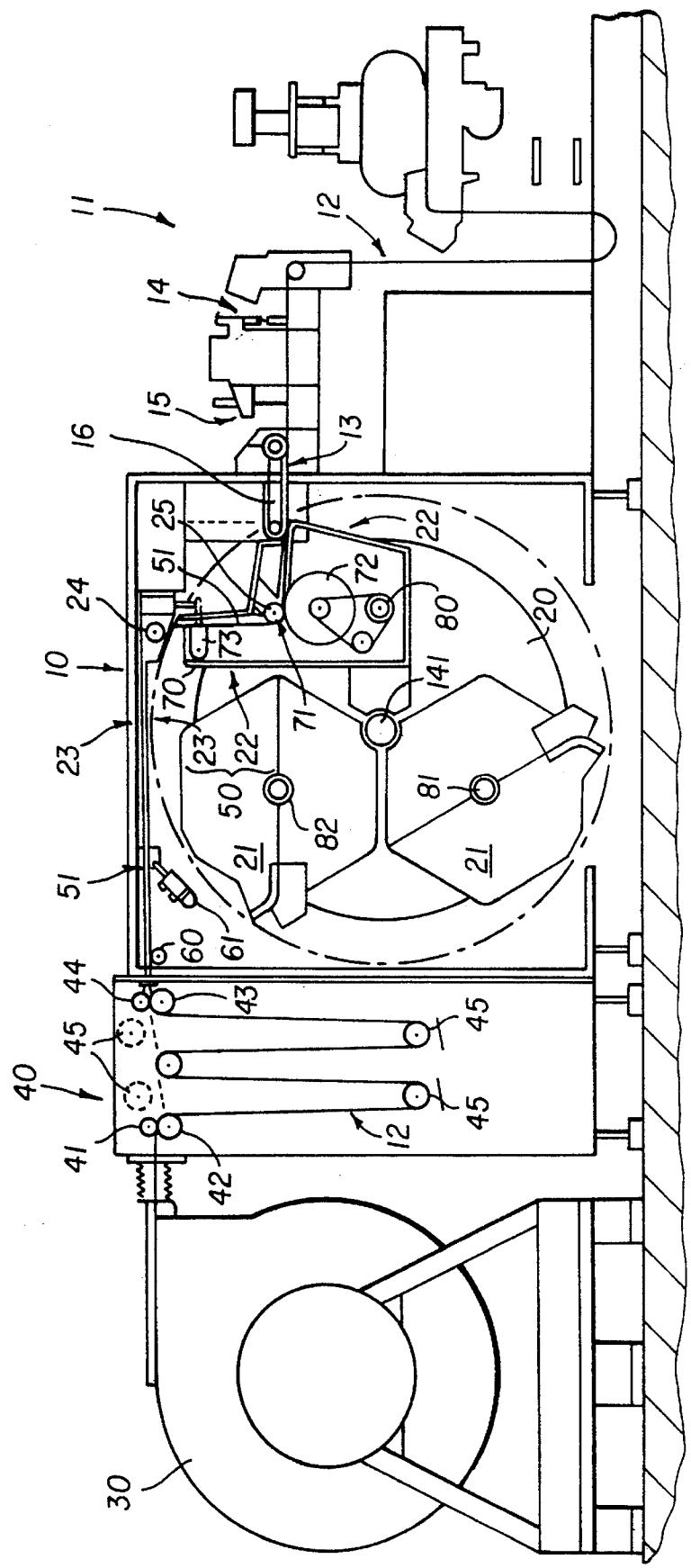
FIG. 1 shows diagrammatically a machine according to the invention using a strip coming from an external source.
Figure 2:
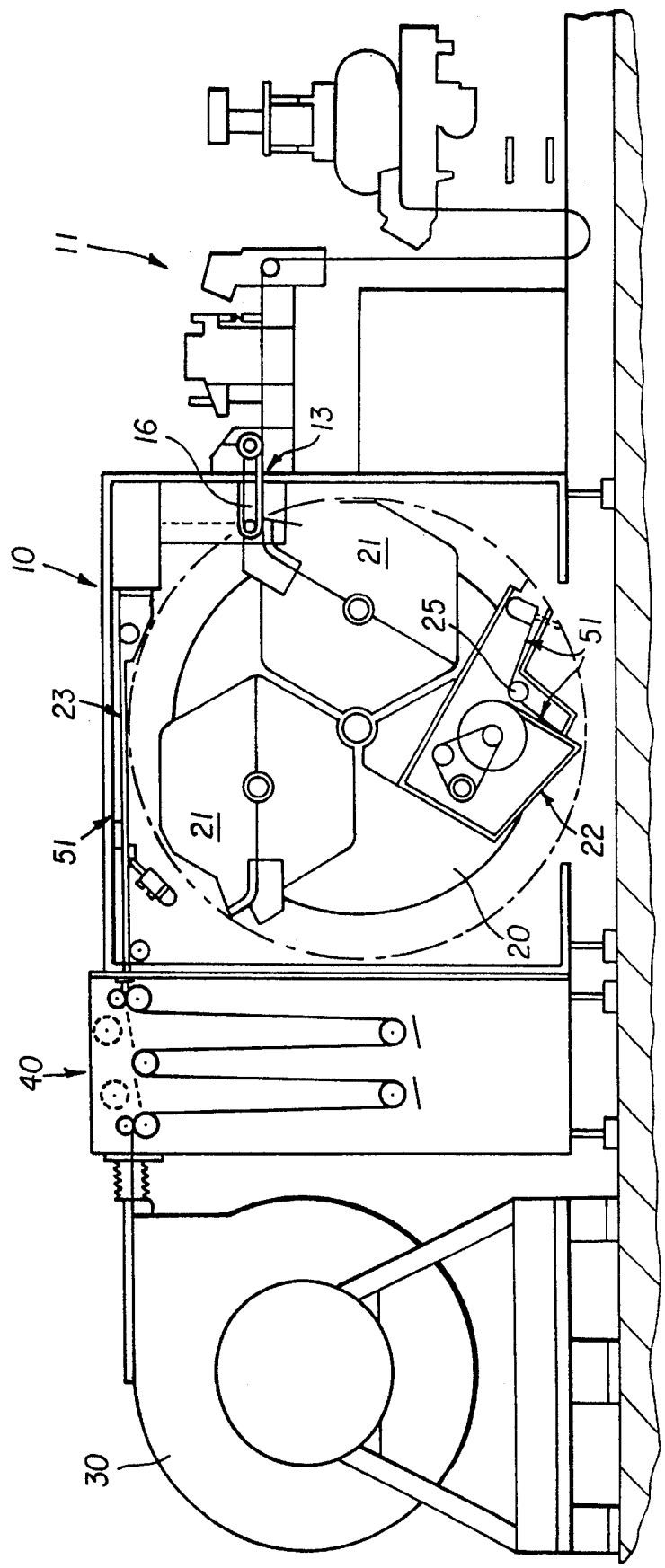
FIG. 2 shows diagrammatically a machine according to the invention using a strip coming from a removable magazine disposed on a rotary turret.

FIGS. 1 and 2 show diagrammatically the feed device 10 for a machine 11, only one part of which is outlined.

The feed device supplies a strip 12 to an inlet slot 13 on the machine in order to make this strip reach a utilisation station (not shown). In the embodiment shown, the inlet slot 13 on the machine is disposed in the vicinity of a splicing station 14 enabling the upstream end of the strip which has already been fed in to be joined to the downstream end of the new strip to be used. Advantageously, the splicing station 14 has a cropping tool 15 enabling the upstream and downstream ends of the strips to be cut.

The known feed device on the machine comprises a rotary turret 20 on which magazines 21, containing strips to be supplied to the machine, are fixed temporarily.

In a particular mode of functioning of the machine, the various magazines 21 contain strips of different qualities. The term "quality of the strip" refers to various characteristics, either chemical or physical, of the strip. In the present application, two strips with different thicknesses or different surface states may be termed strips of different quality.

In a particularly preferred embodiment, the machine is a photographic printing machine and the strips fed in are strips of photographic paper with different surface states or different grades.

In some uses, much greater quantities of a strip of a given quality are used than strips of another quality. In such uses, it is advantageous to be able to supply to a machine a strip coming from an external source 30. The external source may advantageously be similar to the magazine described in the application WO 91/19222. The strip coming from this magazine is transmitted to the machine 11 by means of an interface 40. This interface may be of the type described in the application U.S. Pat. No. 5,383,591. However, as will be seen later, other functions have been incorporated in it.

In order to transmit the strip coming from the interface 40, the machine comprises an interfacing device 50 arranged so as to connect the discharge slot of the interface 40 to the inlet slot 13 on the machine. The interfacing device defines a guide path 51.

As can be seen in FIGS. 1 and 2, the machine is equipped with a movement device 16. This device moves the strip coming either out of the removable magazines 21 or out of the interfacing device 50 to the splicing station 14, whilst maintaining lightproofness.

In the particular case of a photographic printing machine, the path must be lightproof so as not to fog the photosensitive paper which is moved inside the interfacing device 50.

According to the invention, the interfacing device comprises at least two parts 22, 23. A main part 22 which is arranged so as to replace one of the removable chargers 21 and which is fixed to the turret 20 in the same way as the magazines 21. The main part 22 defines part of the guide path 51. Advantageously the region of the main part 22 whereby the strip leaves the guide path 51 is arranged in a similar manner to the region of the removable magazines 21 through which the strip contained in these magazines is extracted from the latter. This arrangement makes it possible not to modify the remainder of the machine. This main part will be described in more detail later.

According to the invention, the interfacing device also comprises a satellite part 23. The satellite part 23 enables the discharge slot of the interface 40 to be connected to the main part 22 and defines another part of the guide path 51. As can be seen in FIGS. 1 and 2, the satellite part 23 comprises a guide roller 24 and the main part 22 comprises a guide roller 25. The guide rollers 24 and 25 rotate freely, which avoids damaging the strip as it passes. The guide path therefore consists of a part which is practically immobile with respect to the machine 11 and another part able to rotate with the turret 20 when it is desired to change the quality of the strip.

In the preferred embodiment according to the invention, the strips are photosensitive products. Because of this, the guide path must be isolated from light so as not to fog the photosensitive product. In order to afford this lightproofness whilst maintaining a path in at least two parts, one of which is fixed to the turret, the satellite part 23 is articulated at 60 so as to tilt between a first position in which this satellite part cooperates with the main part 22 and provides a lightproof path and a second position in which it is moved away from the main part so as not to interfere with the space defined by the magazines 21 disposed on the turret when the latter rotates in order to change the quality of the strip. This tilting is obtained by means of a cylinder 61 controlled by the machine logic (not shown).

The operating principle of the machine according to the invention during the feed stage will now be described briefly. When the operator desires to use a long strip coming from the external source 30, a machine command enables him to dispose the main part 22 of the interfacing device according to the invention in the operating position as shown in FIG. 1. Once the main part 22 is in place, the cylinder 61 is used to tilt the satellite part 23 into its first position in which this satellite part 23 cooperates with the main part 22 in order to obtain lightproofness for the guide path 51. Then the operator inserts the strip coming from the magazine 30 into the interface 40, as described in U.S. Pat. No. 5,383,591, between the drive roll 42 and its pressure roll 41. It will be noted that, in the interface 40 proposed, another drive roll 43 has been disposed, which cooperates with another pressure roll 44 and the function of which will be seen later. A control logic (not shown) associated with the interface 40 makes it possible to insert the strip between the rolls 43 and 44, to bring the pressure roll 44 and drive roll 43 into contact and then to lower the loop-forming rollers 45 which, at the time of start-up, had been disposed by the control logic for the interface 40 in their position shown in broken lines. Once the loops have been formed, the strip is fed by the drive roll 43 and pressure roll 44 into the satellite part 23, then to the main part 22 and finally to the inlet slot 13 on the machine.

When the strip is fed from the external source 30 or external magazine, the guide roller 25 is at a distance from a feed drum 72, as indicated below. A guide member 71, to which the guide roller 25 is fixed, makes it possible to divert the strip of photosensitive product so as to direct it to the inlet slot 13 on the machine. Once the strip reaches the inlet slot 13 on the machine 11, its transport is stopped. Transport of the strip is obtained by means of a determined time delay on the action of the drive roll 43. At this moment, the guide roller 25 and its guide member 71 are tilted about the articulation 70 so as to grip the strip between the guide roller and the drum 72, which will be described in more detail below and which can be driven in rotation in one direction or the other by means of the machine spindle 80. Then the pressure roll 44 is moved away from the drive roll 43 and a clutch (not shown) releases the roll 43, which becomes free to rotate and serves only as a guide roller. Finally, the strip emerging from the main part can be taken over by the movement device 16 on the machine.

Obviously position sensors are disposed on the guide path 51 and are connected to the control logic for the interface 40 and machine 11 so as to control and monitor the progress of the strip of paper. In the preferred embodiment, two position sensors 112, 113 are also used, disposed in the vicinity of the two ends of the satellite part 23 of the interfacing device 50.

When these operations are being carried out, the machine is able to feed the strip in order to carry out successive printings. If the operator desires to change the quality of the strip and use a strip contained in one of the removable loaders 21, the machine interrupts the supply of the strip coming from the external source 30 and, by means of the cropping tool 15, cuts the said strip. The drive roll 43 and pressure roll 44 are brought back into contact with each other, the guide roller 25 and its guide member 71 are once again moved away from the drum 72 and the control logic for the interface and machine causes the drive roll 43 to rotate in reverse, which has the effect of moving the rollers 45 downwards and returning the downstream end of the strip of paper which has just been cut towards the interface 40. The "backwards" movement of the strip of paper is interrupted only when there is no strip of paper in the main part 22, that is when the downstream end of the strip is situated between the units 112 and 113. At this moment the cylinder 61 is used so as to tilt the satellite part 23 into its second position, a position in which it does not interfere with the space defined by the loaders 21 disposed on the turret 20 when the latter is rotated. The operator is then able to dispose whichever of the magazines 21 has been chosen in its operating position as shown in FIG. 2. The movement device 16 on the machine is then used and takes over the strip coming from this magazine 21 so as to bring it to the splicing station 14, where the downstream end is connected to the upstream end of the strip fed in previously. Obviously the splicing station is not essential if the machine has been designed differently, for example to deal with individual pieces corresponding to the format of the final images.

When the operator desires to use once again the strip coming from the external source 30, the machine interrupts the feed of the strip coming from the magazine 21, cuts this strip, which is partially returned inside the magazine 21 by means of the movement device 16, which then runs in reverse. The main part 22 of the interfacing device 50 is then disposed in the operating position as shown in FIG. 1, then the cylinder 61 is actuated so as to tilt the satellite part 23 into its first position and, as described previously, the strip contained in this satellite part 23 is returned towards the main part 22 and towards the inlet slot 13 on the machine, where this strip is once again taken over by the movement device 16 on the machine 11. It is clear that, during this feed, the rollers 45 are returned to their previous position, an intermediate position in which the function which they fulfil is the one described in the application U.S. Pat. No. 5,383, 591.

Figure 3:
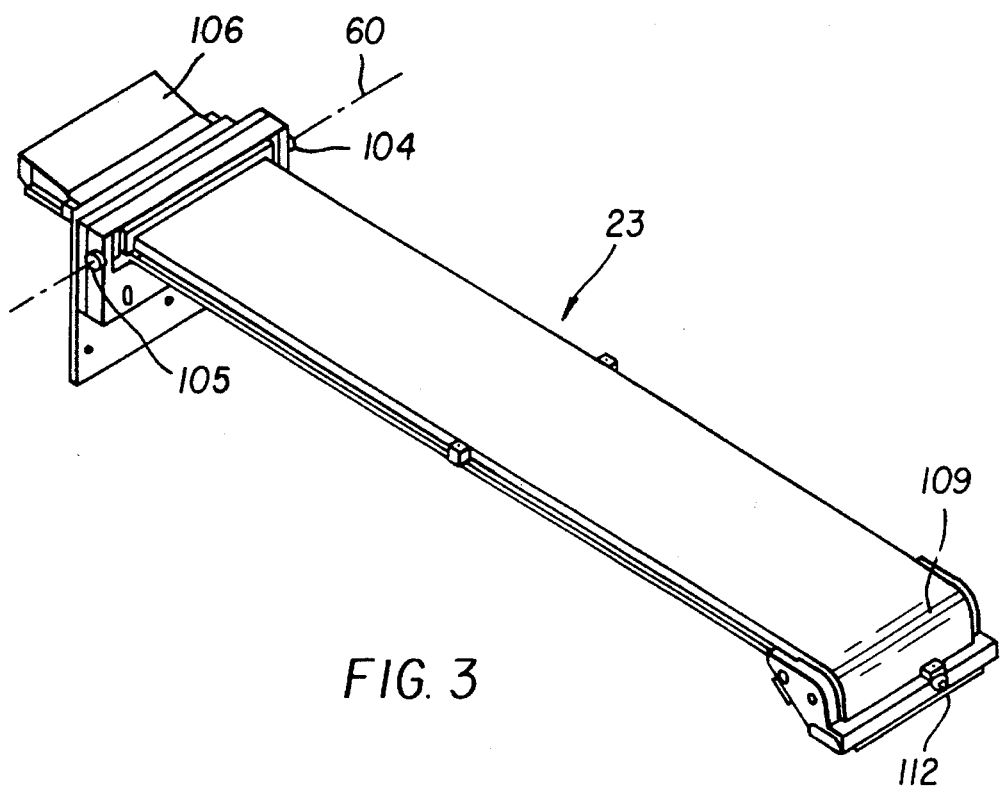
FIG. 3 shows a perspective view of the satellite part of the interfacing device.
Figure 4:
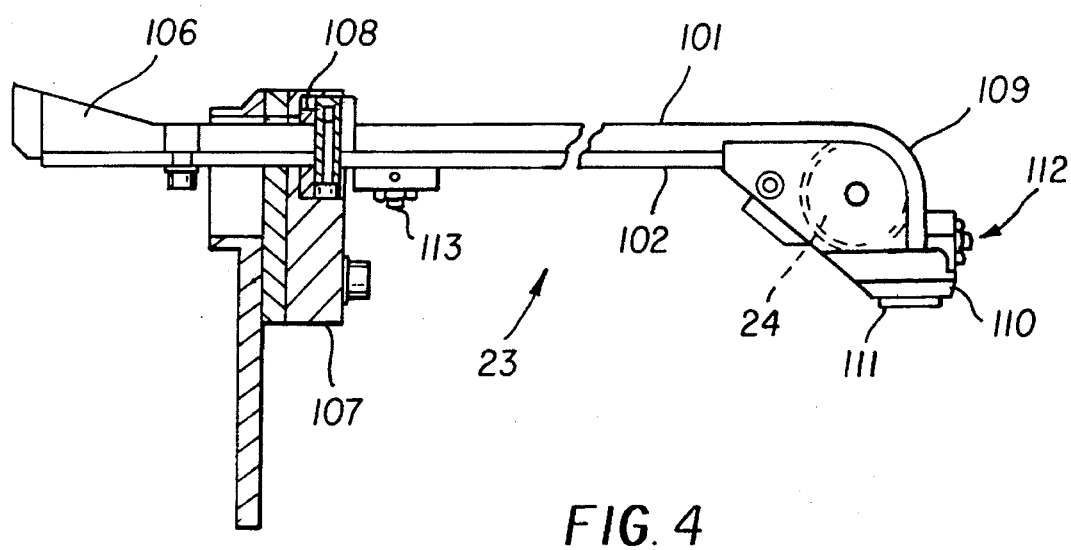
FIG. 4 shows a diagrammatic cross section of the satellite part shown in FIG. 3.
Figure 5:
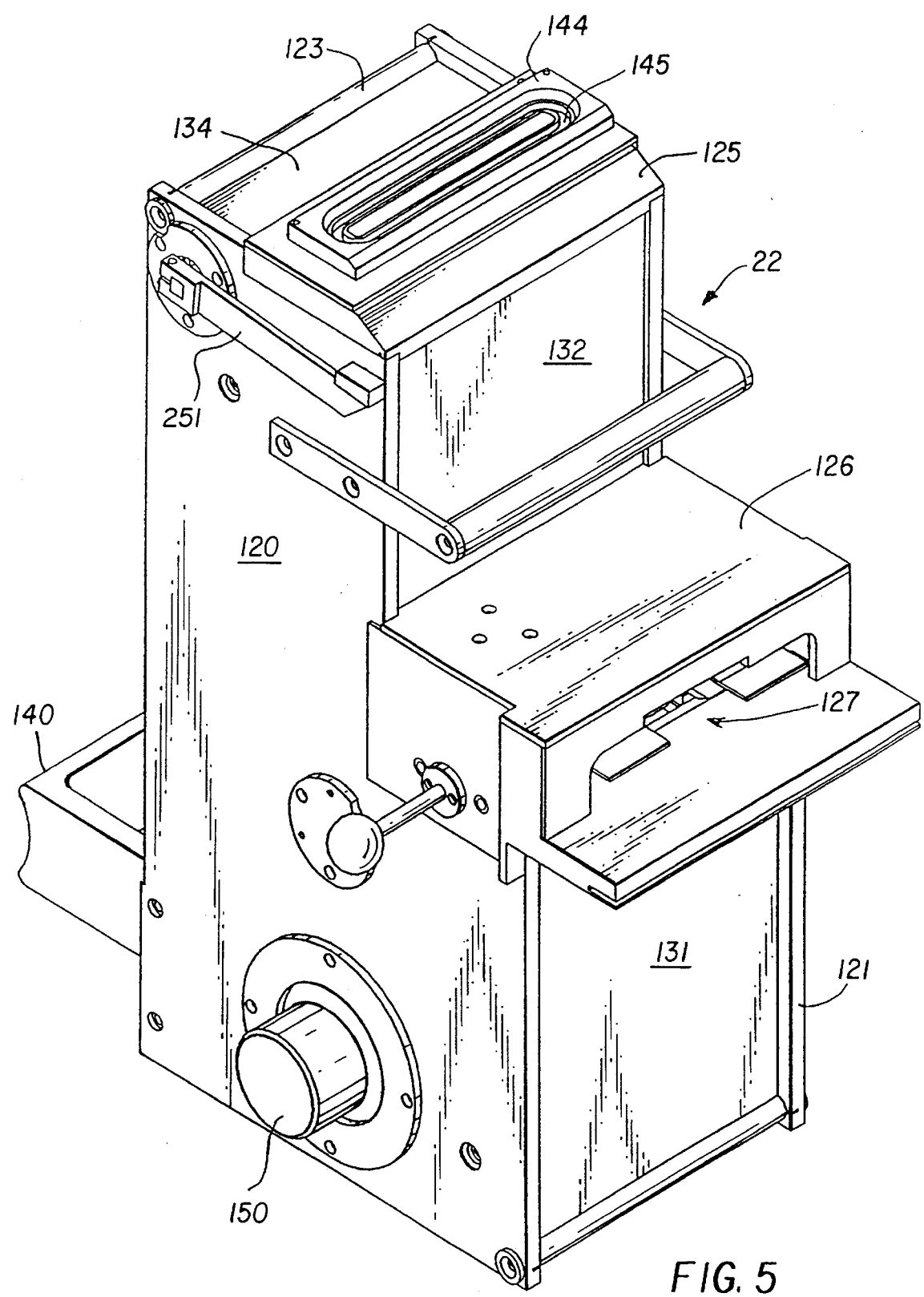
FIG. 5 shows a perspective view of the main part of the interfacing device used in the invention.

The satellite part 23 and the main part 22 of the interfacing device 50 will now be described with reference to FIGS. 3 to 8. As can be seen in FIGS. 3 and 4, the satellite part 23 consists principally of two plates 101, 102 connected together so as to define a part of the guide path 51. The upstream part 106 of the satellite part 23 projects beyond the casing of the machine 11 and enters the discharge slot of the interface 40 into the inside of this interface. Advantageously, this upstream part 106 has a funnel shape so as to facilitate the insertion of the strip of paper into the said satellite part 23. The satellite part 23 is mounted on the machine casing by means of pins 104, 105 so as to allow its tilting, which is controlled by the cylinder 61. The pins are held by a support 107 fixed to the machine casing.

In order to obtain lightproofness, a flexible sealing joint surrounding the discharge slot of the interface 40 is disposed between the casing of the interface 40 and the casing of the machine 11. In addition, an elastic joint 108 is fitted, held by the support 107 and pressed tightly against the satellite part 23. It is clear that any other arrangement may be used to provide this lightproofness.

The satellite part 23 has, at its downstream 109, a rounded wall serving to divert the strip of paper when the latter is moved by the rolls 43, 44 during the feeding of the strip of paper. In addition, this end 109 has a guide roll 24 able to rotate freely so that the surface of the strip will not be damaged when the latter is transported.

It will also be noted that this end 109 also has an end piece 110, the external walls of which are sloping and which has a thin lip 111 serving to establish lightproofness when the satellite part 23 and main part 22 interact.

Figure 6:
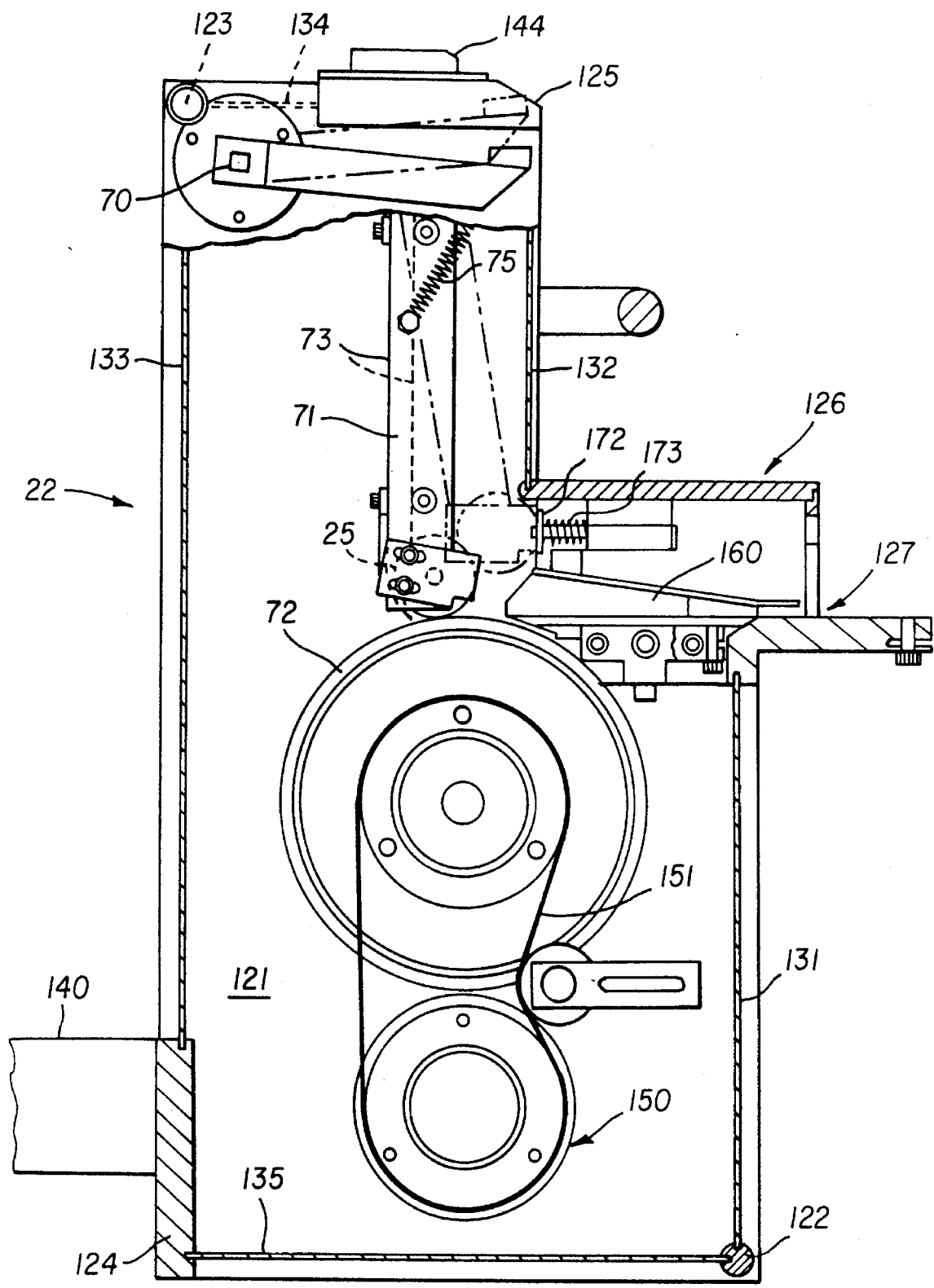
FIG. 6 shows a view in cross section of the main part shown in FIG. 5.

Reference will now be made to FIGS. 5 to 8 in order to understand better the structure of the main part 22 of the interfacing device 50 used in the invention. The main part consists of a lightproof frame formed by two side plates 120, 121 secured to each other on the one hand by rods 122, 123 which, as can be seen in FIG. 6, have longitudinal grooves, and on the other hand by a support 124, a top piece 125 and a casing 126. The support 124, top piece 125 and casing 126 also have grooves. The grooves are designed so as to receive front panels 131, 132, a rear panel 133, a top panel 134 and a bottom panel 135. The panels also enter the grooves made in the side plates 120 and 121. This type of mounting makes it possible to ensure lightproofness whilst avoiding welding. Obviously any other type of fixing providing lightproofness could be used.

Advantageously, the main part is constructed so as to occupy the space left vacant when one of the removable magazines 21, which is normally fixed to the turret 20, is removed. In addition, it is advantageous for the system for fixing the removable magazines be used to fix the main part 22. In the embodiment shown in FIGS. 5 and 6, the support 124 has an extension 140 which cooperates with the shaft 141 of the turret 20 in the same way as certain parts of the removable magazines cooperate with this shaft 141. In addition, the main part 22 has a hollow shaft 150 which surrounds one of the drive spindles 80, 81, 82 on the machine. It is therefore easy to slip the magazines 21 or main part 22 onto the spindles, rotation being prevented by the interaction of the extension 140 with the turret shaft. In order to simplify the operation of the machine, it is advantageous for the main part always to be associated with the same machine shaft. To this end, between the turret 20 and main part 22, a locating device is disposed, which may take the form of a pin (not shown) cooperating with a corresponding hole (not shown) made in the turret 20.

The top piece 125 is surmounted by a frame 144, the shape of which is designed to interact with the end piece 110 and provide lightproofness. It will be noted that the frame 144 has a recess 145 surrounding the slot through which the strip passes and that this recess is arranged so as to receive the lip 111 of the end piece 110. In this way, between the satellite part 23 and main part 22, a V-shaped junction is defined through which light is not able to pass.

The main part comprises a drum 72 connected to the shaft 150 by a toothed belt 151 so as to be able to be driven in rotation by the machine control unit.

Advantageously, the top part of the drum 72 is practically at the same level as the bottom of the casing 126.

A cranked arm is articulated at one of its ends at 70 and at its other end supports the guide roller 25. As can be seen in FIG. 6, the cranked arm carries a guide 71 defining the guide path 51 by means of two walls 73. The end of the wall situated in the vicinity of the guide roller 25 outside the latter is slightly curved (FIG. 6). The cranked arm is acted upon by a spring 75 so as to move the guide roller 75 away from the drum 72. In this position the cranked arm adopts a position shown in broken lines in FIG. 6, in which the cranked arm is practically bearing against the top piece 125. The guide defined by the walls 73 therefore coincides with the opening in the frame 144. In this way the strip is guided after diversion by the rounded wall of the downstream end 109 of the satellite part as far as the end of the cranked arm carrying the guide roller 25. The guide 71 has, at its bottom part, a region which is slightly curved so as to bend the strip and cause it to enter the casing 126, where it slides over the bottom of this casing and then emerges from this casing through an opening 127. As can be seen in FIG. 6, the bottom of the casing 126 extends sufficiently towards the drum 72 for the photosensitive paper not to be jammed between the drum 72 and the bottom of the casing 126.

Once the strip has reached the inlet slot 13, the cranked arm is tilted by means of a cylinder which moves a lever 251 articulated at 70. The tilting of this lever 151 moves the cranked arm so as to push the guide roller 25 towards the drum 72. The force exerted by the cylinder is sufficient to overcome the force exerted by the spring 75 and press the strip onto the drum 72 so that any movement of the drum drives the strip. Once this operation has finished, the pressure roll 44 of the interface 40 is raised and a clutch (not shown) disengages the connection between a motor and the drive roll 43, which is thus transformed into a guide roller. The interface 40 thereafter functions as described in U.S. Pat. No. 5,383,591.

In an advantageous embodiment, the interfacing device 50 is able, like the machine, to receive strips of various widths. However, this necessitates a more precise guidance at the inlet slot of the machine 11. In order to achieve this more precise guidance, the casing 126 is provided with two additional lateral guides 160, which it is possible to move by means of a control lever 161 projecting beyond one of the walls of the casing. The lateral guides 160 are L-shaped so as to limit the lateral and vertical movements of the strip.

The lever 161 is guided on the one hand by the opening in the wall of the casing allowing it to pass and on the other hand by a collar secured to the bottom of the casing.

Advantageously, the lever 161 has several positioning grooves 163 which interact with a spring ball 164.

Advantageously, when the strip coming from the external source starts off, the guides 160 are brought closer together by rotation about respective offset axes.

Figure 7:
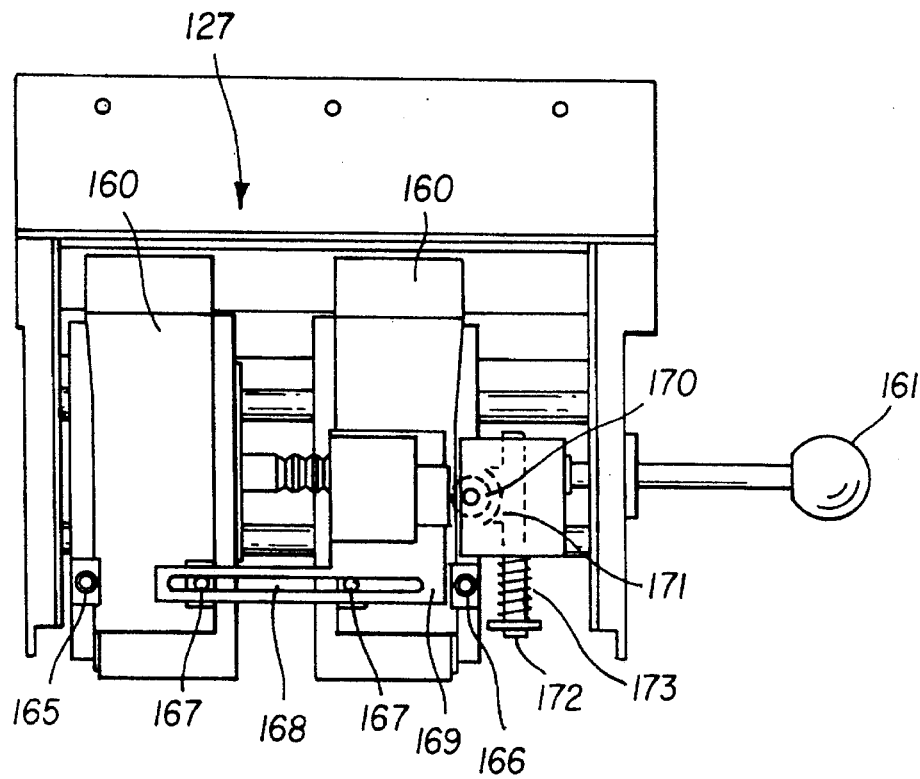
FIGS. 7 and 8 show a detail in plan view and elevation of a mechanism included in the main part of the interfacing device.
Figure 8:
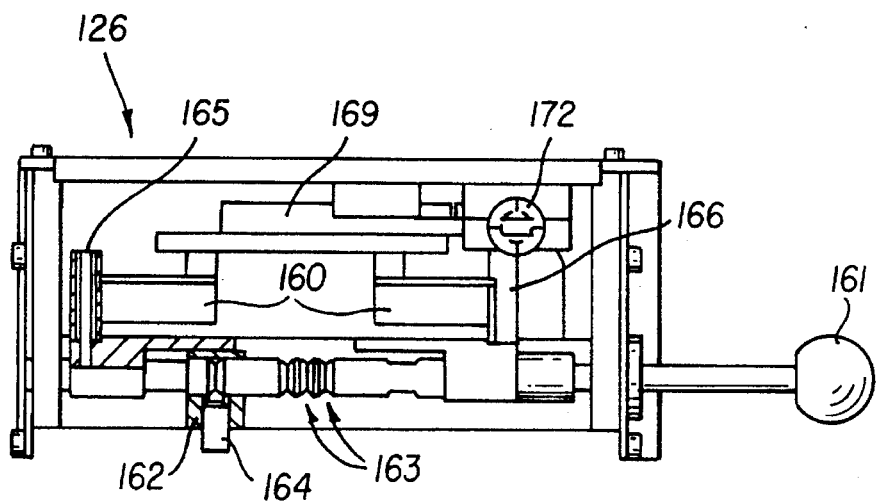

In the embodiment shown in FIGS. 7 and 8, one of the edges of the strip has a fixed lateral position and serves as a reference. The shaft 165, serving an articulation for the guide 160, is therefore fixed with respect to the casing. The shaft 166, serving as an articulation for the other lateral guide 160, is secured to the control lever 161.

The temporary bringing closer together of the ends of the lateral guides 160 at the time of starting off is obtained by means of the pins 167, which are secured to the guides 160 and which enter a groove 168 which can be moved. In the embodiment shown, the groove 168 forms part of an assembly with a runner 169 provided with a rack engaging with a gear 170. The gear 170 is driven by another rack 171 carried by a slide 172 acted upon at rest by a compression spring 173. At rest the lateral guides 160 adopt a position in which their respective downstream ends are separated from each other by the action of the compression spring 173. The distance between the downstream ends of the two lateral guides 160 is greater than the width of the strip by approximately 3 mm when these ends are brought closer together.

When the interfacing device 50 is in operation, the cranked arm is in the position shown in solid lines in FIG. 6 and does not bear on the slide 172. The compression spring then enables the downstream ends of the additional guides 160 to be moved away from each other and the distance is greater than the width of the band by approximately 20 mm. When the cranked arm is no longer tilted by the corresponding cylinder, the traction spring 75 causes it to tilt and it comes into contact with the slide 172 so as to move it and thus form a guide passage with a smaller width.

We claim:

1. A machine comprising:
    a) an inlet slot for receiving a strip and directing the strip to a station where the strip is to be used;
    b) a feed device provided with a rotary turret able to receive a plurality of movable feed magazines containing rolls of material in strip form;
    c) a means for driving, towards the inlet slot, a strip coming from one of said plurality of feed magazines; and
    d) a means for interrupting the feed of the strip for the purpose of changing the feed magazines used;
    e) an interfacing device arranged so as to connect the inlet slot to an external strip feed source,
    said interfacing device including a guide path for the strip coming from the external strip feed,
    said guide path including a part able to rotate with the turret.

2. Machine according to claim 1, in which the strip is a photosensitive strip.

3. A machine according to claim 2, in which the interfacing device comprises a first means for connecting the external source to the part of the guide path able to rotate with the turret when this part is used, said first means being articulated so as to tilt between a first position in which this first means provides a lightproof path during the use of the external strip feed source and a second position in which this first means is situated outside the space defined by all the removable feed magazines when the turret rotates.

4. A machine according to claim 1 wherein said means for interrupting also cuts the strip thereby creating a leading end, the interfacing device including means for moving the leading end of the strip towards the external source when said means for interrupting the feed of the strip is actuated, so that the part of the guide path which rotates with the turret no longer contains any strip.

5. A machine according to claim 4, further comprising a guide device defining a narrow path when the strip is started off and a path of normal width when the external source is used.

6. A method for supplying a product in strip form coming from a source external to a machine having an inlet and fitted with feed magazines disposed on a rotary turret for the purpose of disposing the feed magazines one after another in a position in which the feed magazines are able to supply the strip contained therein to the machine, the discharge from the source external to the machine being connected to the inlet to the machine by means of a path, at least one part of the path being fixed to the rotary turret and rotatable with the rotary turret.

\* \* \* \* \*